Sept. 3, 1957     C. E. HURLBURT     2,805,383

VOLTAGE REDUCTION CIRCUIT

Filed May 10, 1955

INVENTOR.
CHARLES E. HURLBURT
BY
ATTORNEY

United States Patent Office 2,805,383
Patented Sept. 3, 1957

2,805,383

VOLTAGE REDUCTION CIRCUIT

Charles E. Hurlburt, River Edge, N. J., assignor to Bendix Aviation Corporation, Teterboro, N. J., a corporation of Delaware Application May 10, 1955, Serial No. 507,239

4 Claims. (Cl. 323—44)

This invention relates to a voltage reduction circuit, and especially to a circuit arrangement for obtaining from a three phase four wire supply system a three phase output of lower voltage.

The invention is applicable to installations in which there are objections to the use of the ordinary transformer systems for obtaining the desired reduction in voltage, including not only the ordinary three-phase transformers but also two single phase transformers in so-called "open delta" arrangement, in which transformer windings offset by 120° are connected at one end only. These objections are especially serious in aircraft installations where minimum space and weight are very important. Moreover, the voltage of the standard aircraft three phase electrical supply system is higher than is permitted by practical considerations in the design of small motors, such as those used in certain aircraft instruments, for example, gyros. Also, in such installations each transformer must generally be large enough to handle the entire power requirements of the motor.

An object of the invention is to derive from a four wire three phase supply a three phase output at a lower voltage than that of the supply by an arrangement having reduced weight and space characteristics.

Another object is to derive said three phase lower voltage output by an arrangement employing only one transformer.

A further object is to obtain said output using a transformer which is required to handle only one-half of the output power.

A general purpose is to attain any of these objects by a simple circuit arrangement requiring a minimum of parts, all of standard type, having less weight and requiring less space than previous systems for the same purpose.

These and other objects and advantages of the invention will appear more fully from consideration of the detailed description which follows, in conjunction with the accompanying drawing, wherein one embodiment of the invention is illustrated. It is to be expressly understood, however, that the drawing is for the purposes of illustration and description and is not to be construed as defining the limits of the invention.

Figure 1:
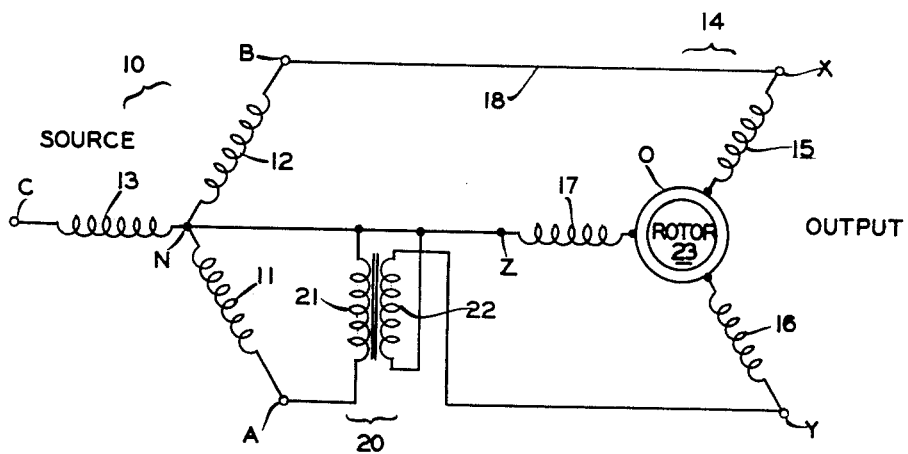
Fig. 1 is a circuit diagram of an arrangement embodying the invention.

The energy source, which may be of the type employed in many naval aircraft, is of the three phase four wire Y type. As illustrated, this source 10 has a neutral point N connected by windings 11, 12 and 13 to line terminals A, B and C respectively, and carrying phases offset by 120° in the usual manner. In the present arrangement the terminal C is not used. Terminals A and B are connected only at point N, forming what is generally referred to as an "open delta" arrangement.

The corresponding three phase output unit 14 includes a Y-connected arrangement of impedances, such as windings 15, 16 and 17, connected to each other at one end at the junction O and at their outer ends to terminals X, Y and Z, respectively. In connecting the source 10 to the output unit 14, terminal B is connected to terminal X by lead 18, terminal N is connected to terminal Z by lead 19, and terminal A is connected to terminal Y through a 1-to-1 transformer 20 having a primary winding 21 connected between terminal A and terminal N, and a secondary winding 22 connected between terminal N and terminal Y. The two terminal connections to the transformer are reversed; that is, terminal Y is connected to an end of secondary 22 opposite to the end of primary 21 to which terminal A is connected.

The supply voltages at source 10 between line terminals A and B, B and C, and C and A, respectively, are of course much higher than the voltages between each of these terminals and the central or neutral junction terminal N. For instance, in a known system of this type, where the voltage between junction N and each of said terminals is 115 volts, the voltage between adjacent terminals, which of course is the supply voltage, is 200 volts.

In a circuit of the type shown in Fig. 1 the voltage between output terminals Z and X will be the same as the voltage between source terminals N and B, which in the illustration given will be 115 volts. Likewise the output voltage between output terminals Y and Z will be the same as that between source terminals A and N, since the transformer 20 has a 1-to-1 ratio; but the polarity will be reversed. The voltage between output terminals X and Y will likewise be the same as that between junction N and each of the terminals B and A, because of the reversal of polarity through transformer 20. In the absence of this transformer the voltage between X and Y would be voltage B–N plus the voltage N–A, which would be the higher voltage across B and A. With the N–A voltage reversed, the X–Y voltage will be B–N+A–N, which represents the lower voltage between A and B, respectively, and N.

Figure 2:
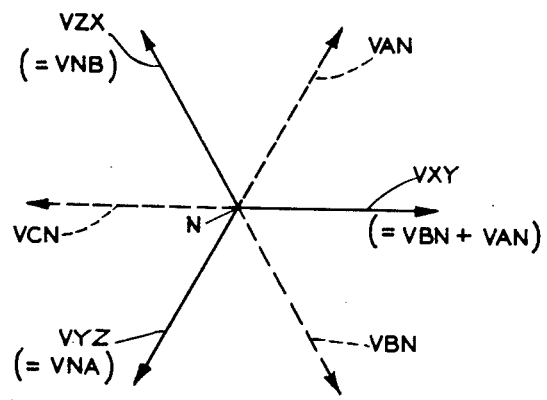
Fig. 2 is a vector diagram of voltage factors in said system.

This fact, and the angular relation of the source phases of the output, will be clear from the vector diagram given in Fig. 2, in which the voltage phases of the source 10 are shown in dotted lines. The voltage between A and N is indicated by the dotted line $V_{AN}$; the voltage between B and N by dotted line $V_{BN}$. The voltage between C and N is shown as $V_{CN}$ for completeness, but can be disregarded, since it is not used in energizing the output unit 14.

The voltage vectors for the output unit 14 are represented in Fig. 2 by full lines. The voltage from source 10, applied from terminal Z to terminal X of the output unit 14, is designated by the vector $V_{ZX}$, which of course is the same as $V_{NB}$. The voltage from Y to Z, indicated by the vector $V_{YZ}$, will be the same as the voltage from N to A, because of the reversal by transformer 20, vector $V_{YZ}$ being equal in length but opposite in direction to vector $V_{AN}$, due to the action of transformer 20. The voltage from X to Y, indicated by vector $V_{XY}$, will equal the resultant of the voltage from B to N, indicated by $V_{BN}$, and the voltage from A to N, indicated by $V_{AN}$. This will locate the vector $V_{XY}$ halfway between vectors $V_{AN}$ and $V_{BN}$. Since the latter voltages are each equal to the voltage from A or B to N, the length of vector $V_{XY}$ will be the same as that of vectors $V_{AN}$ and $V_{BN}$, which will represent 115 volts in the specific example given.

This arrangement therefore provides output voltages between terminals X and Y, Y and Z and Z and X at the lower voltage represented by the voltage across the individual windings of the source 10, and not the higher voltage across the supply terminals of said source. Moreover, the phases in the output unit 14 are offset by 120°, as shown by the vector diagram in Fig. 2, and are arranged in the correct phase sequence.

The output unit 14 may be utilized in various ways. It is illustrated as constituting the stator of a three phase motor having a rotor 23, and the impedances 15, 16 and 17 comprising the field coils. This arrangement is especially suitable for use in gyroscopes, whose small, high speed motors have inherent limitations on practical voltages for efficient design. It is also advantageous for use with other small motor installations which are subject to similar limitations and requirements.

It will be apparent that the output circuit may be either Y-connected as shown, or delta-connected; and references herein to symmetrically connected elements are intended to indicate generically these two types of three phase connections, and types analogous thereto. Similarly, references to symmetrically connected terminals are intended to refer to the terminals thus connected.

Although but one embodiment of the invention has been illustrated and described in detail, it is to be expressly understood that the invention is not limited thereto. Various changes can be made in the type, arrangement and interconnection of the elements without departing from the spirit and scope of the invention as the same will now be understood by those skilled in the art.

I claim:

1. A three phase voltage reducing system for deriving a lower three phase voltage from a three phase Y-connected source having line terminals for each phase and a neutral terminal common to all phases, comprising three output impedances symmetrically interconnected to three output terminals, a supply circuit connecting the neutral terminal to a first output terminal, a supply circuit connecting a line terminal to a second output terminal, and a supply circuit connecting another line terminal to the third output terminal, one of the latter two circuits comprising polarity reversing inductive coupling transformer means.

2. A three phase voltage reducing system for deriving a lower three phase voltage from a three phase Y-connected source having a line terminal for each phase and a neutral terminal common to all phases, comprising three output impedances symmetrically interconnected to three output terminals, a supply circuit connecting the neutral terminal to a first output terminal, a supply circuit connecting a line terminal to a second output terminal, and a supply circuit connecting another line terminal to the third output terminal, one of the latter two circuits comprising polarity reversing means, including a one-to-one transformer.

3. A three phase voltage reducing system for deriving a lower three phase voltage from a three phase Y-connected source having a line terminal for each phase and a neutral terminal common to all phases, comprising three output impedances symmetrically interconnected to three output terminals, a supply circuit connecting the neutral terminal to a first output terminal, a supply circuit connecting a line terminal to a second output terminal, and a supply circuit connecting another line terminal to the third output terminal, one of the latter two circuits comprising polarity reversing means, including a one-to-one transformer having a primary winding connected at one end to a line terminal and a secondary winding connected at the opposite end to an output terminal, the remaining ends of said primary and secondary windings being connected to said neutral terminal.

4. A three phase voltage reducing system for operating a three phase motor from a three phase Y-connected source having a line terminal for each phase and a neutral terminal common to all phases, comprising a three phase motor including three field coils symmetrically connected to three terminals, a supply circuit connecting the neutral terminal to a first motor terminal, a supply circuit connecting a line terminal to a second motor terminal, and a supply circuit connecting another line terminal to the third motor terminal, one of the latter two circuits including polarity reversing inductive coupling transformer means.

References Cited in the file of this patent

UNITED STATES PATENTS 1,753,383    McDonald _____ Apr. 8, 1930

OTHER REFERENCES

Pub. "Experimental Electrical Engineering," vol. 2, by V. Karapetoff, published 1907, by John Wiley & Sons Inc., pp. 108–111.